Oct. 20, 1931.  M. HARRIS  1,828,367
FRICTION SPRING BRAKE
Filed Dec. 20, 1926   2 Sheets-Sheet 1
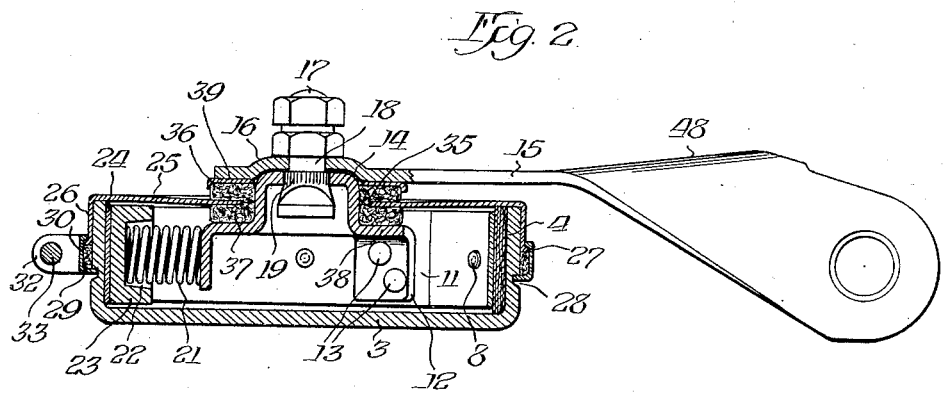
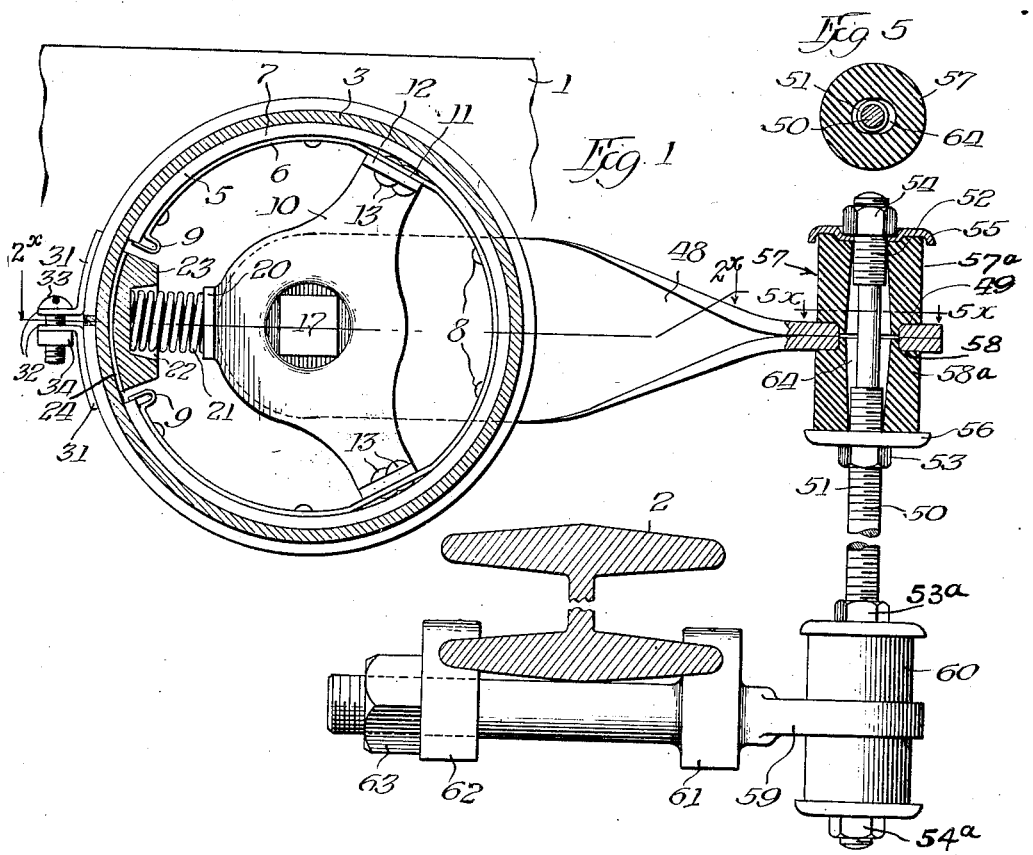
Inventor
Mark Harris Oct. 20, 1931.  M. HARRIS  1,828,367
FRICTION SPRING BRAKE
Filed Dec. 20, 1926   2 Sheets-Sheet 2
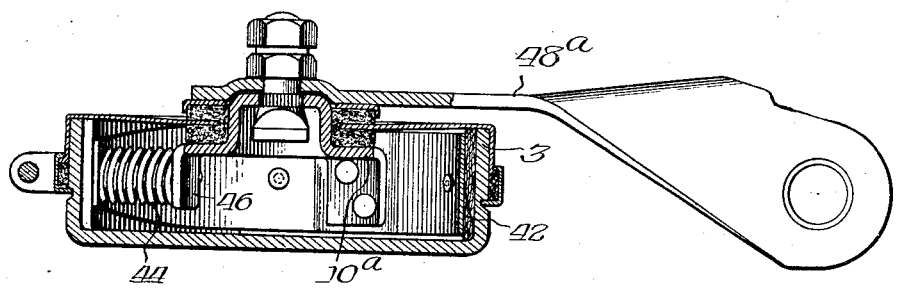
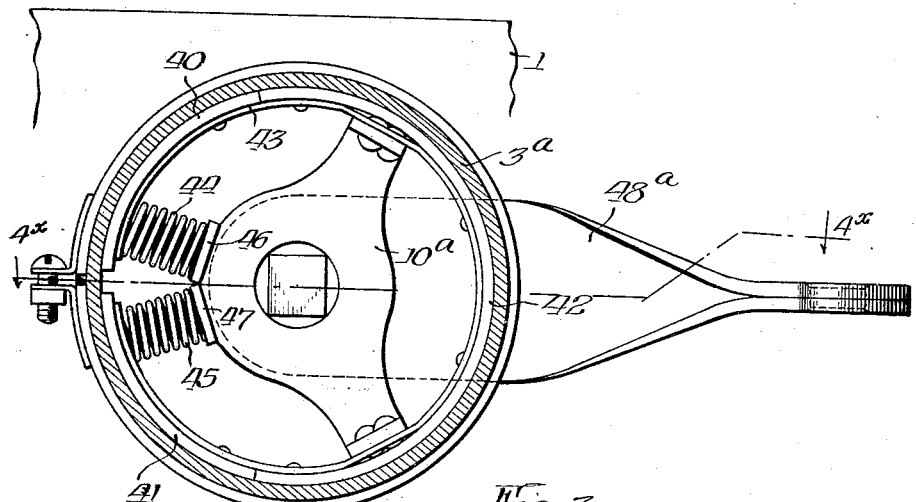

Patented Oct. 20, 1931

1,828,367

UNITED STATES PATENT OFFICE

MARK HARRIS, OF DETROIT, MICHIGAN, ASSIGNOR, BY MESNE ASSIGNMENTS, TO DELCO PRODUCTS CORPORATION, OF DAYTON, OHIO, A CORPORATION OF DELAWARE

FRICTION SPRING BRAKE

Application filed December 20, 1926. Serial No. 155,830.

This invention relates to an energy absorbing device designed primarily as a spring brake or shock absorber, (hereinafter referred to as a spring brake), to be interposed between two spring-connected members of a vehicle for controlling excessive spring movements occasioned by irregularities in roadway surfaces, and particularly energy absorbing devices embodying in their organization a friction surface drum mounted upon one of the spring-connected members, for instance, the spring supported frame of a chassis, and an expansible brake band oscillated, in contact with such surface, by suitable operating means, for instance, a radial arm connected to the other of the spring-connected members, for instance, the axle; and the said invention embodies certain novel conditions in its operative principle and in its construction, among which are the following:

The elimination of the central spindle and fixed bearing therefor heretofore employed in connection with the expansible band type of spring brake, and consequent reduction of the organization to a simple construction requiring no lubrication; this novel condition being realized by employing the frictional bearing of the brake band on the drum as the centering and supporting bearing for the oscillatory operating means, for instance, the aforesaid radial operating arm and a yoke connecting said arm to the brake band; in other words, by floating the center of oscillation within the drum through means of the brake band, and having all thrust incident to movement of the brake band by the operating arm, received on the friction surfaces which require no lubrication, and in a manner to amplify frictional resistance as distinguished from fixing the center of oscillation in, and having all except circumferential thrust taken up by outside bearings which detract from frictional resistance and render the life and continued functioning of the device subject to the supply of lubricant to such bearings; also Having the frictional resistance to oscillatory movement developed by the friction band automatically, without the interposition of cams, toggle levers, or other positive spreading means in the connection between the operating arm and the brake band, thereby not only simplifying the connection between the operating arm and the brake band, but adapting the brake band to assume different initial positions of revolution relatively to the drum, to correspond with various initial depressions of the spring under the load which it carries, and to operate from any such initial position; namely, by having the brake band constructed with a free, resilient end portion beyond its connection with the oscillating means, and particularly the end which constitutes the leading portion of the brake band during those movements which correspond to rebound of the spring, and preferably embodying the same condition in that end of the brake band which leads in movements corresponding to spring compression; and having the inherent resiliency of such leading portion or portions acting in the direction to initiate frictional bearing against the drum, so that the leading portion develops a drag, frictional resistance, or reluctance to rotation, which, under thrust imparted to the brake band in rear of such leading portion, causes the brake band as a whole to expand and increase its frictional resistance, and causes this result to follow in varying degrees proportional to the suddenness of the rotary movement, and therefore proportional to the violence of energy which is to be resisted; also Having means for increasing the reluctance or drag of the leading end or ends of the brake band over that developed by its, or their, normal inherent resiliency, such means comprising either or both of two expedients, and one or another of several different arrangements thereof, to-wit: reinforcing resilient means acting radially against the leading portion or portions; or a friction shoe in sliding contact with the drum and in the path of the leading end, so that the leading end impinges against it and has the drag of the shoe added to the drag of the leading end in developing the reluctance or resistance which expands the band as a whole, said shoe serving, if desired, for either leading end, alternately, by having it interposed between said ends; or having the auxiliary resilient means acting directly upon and increasing the frictional drag of the shoe, and thus indirectly upon the leading end or ends; also Adapting a spring brake of the kind described, and particularly when provided with a reinforcing friction shoe, to limit the interposition of its braking influence, or at least braking influence of a substantial order, to those spring movements which are of sufficient amplitude to render braking influence desirable, so that all those movements resulting from minor road inequalities which are largely absorbed in the axle, and transmission of which to the body would be objectionably increased by substantial braking resistance at the time, will be left without substantial resistance; but any amplitude of spring compression or spring reaction, or both, exceeding a predetermined order, will automatically call into play a substantial braking influence and one corresponding to the severity of the force to be controlled; this result being attained automatically by the very simple expedient of introducing, between the friction shoe and the leading end or leading ends of the brake band, lost motion of such dimension that all those oscillatory motions transmitted through the radial arm by unobjectionable vibrations of the spring, will be opposed only by the normal braking influence of the band alone, and with the low coefficiency of friction incident to such slight movements; but whenever the spring compression, or the reaction of the spring from compression, exceeds the predetermined minor range, the friction shoe will be picked up by the leading end and the braking resistance will be of a substantial order appropriate to the amplitude of spring movement since it results from the drag or reluctance of the leading end and friction shoe combined which, being automatically built up according to suddenness of movement, will be commensurate with the energy to be absorbed; also The provision of means for establishing angularly flexible articulation between a radial operating arm, through which the band is oscillated, and the axle or other spring-connected part to which it is to be united, without involving metal to metal contact between joints, and therefore, without the necessity of lubrication in keeping the parts properly operative; this condition being realized by introducing between the radial arm and an element to which it is to be connected, for instance, a bracket attached to the vehicle axle, a rod passing through openings, substantially larger than the rod, in both the arm and the bracket and completing a wrist joint connection between the rod and each member through which it passes, by means of resilient material surrounding the rod on opposite sides of the member and extending between the rod and the sides of the opening, or otherwise spacing said metal portions apart; the resilient material being held under desired initial compression by appropriately spacing abutments by which it is fixed upon the rod.

Other distinguishing characteristics of the invention, as well as the structural details of two alternative embodiments thereof, will be readily understood from the following description when taken in connection with the accompanying drawings, in which—

Figure 1 is a side elevation of one form of the invention, shown partly in cross-section to disclose the construction of the means for articulating the operating arm and the axle of the vehicle;

Figure 2 is a cross-sectional view of Figure 1 taken on line $2x$—$2x$ looking from above;

Figure 3 is a side elevation, partly in cross-section, similar to Figure 1 but of a modified form of the invention and with the angularly articulating means omitted;

Figure 4 is a view similar to Figure 2 taken on line $4x$—$4x$ of Figure 3; and

Figure 5 is a cross-sectional view taken on line $5x$—$5x$ of Figure 1.

Referring to the form of the invention illustrated in Figures 1 and 2, which embodies a spring brake to be introduced between two spring-connected vehicle members such as a chassis frame 1 and axle 2, the drum 3 is rigidly attached to the chassis frame and is provided with a friction surface, such as at 4, adapted to receive in frictional bearing, an expansible brake band 5 which is composed of a metallic ring 6 and a facing of frictional material, shown at 7 attached to its outer surface by suitable means, such as rivets 8, the band having inherent resilience so as to bear with an initial pressure against the drum surface. Brake band 5 is provided with spaced ends which are resilient and free to press against the drum and said ends are bent to form abutments 9; and it has attached to it, at points remote from its ends, the means through which its oscillation is controlled, to wit: the arms of a yoke 10, such attachment being preferably accomplished by riveting a portion 11 of the band to the feet 12 as shown at 13.

The yoke is provided with a centrally disposed hub 14 which projects laterally from the side of the drum, and receives the operating arm 15, by engaging in the seat provided on the arm at 16, the arm being held rigidly on the hub by the bolt 17, and prevented from rotating thereon by the non-circular form of the meeting surfaces, and by the driving fit of the shank 19 of the bolt, in the central opening of the hub. Through this means, the elements, for instance, the radial arm and its connecting yoke, by which movement of the band is controlled, have no positioning or guiding bearing other than that developed by the frictional bearing of the band in the drum.

The yoke is further provided with a seat 20 which is adapted to receive one end of a coiled spring 21, the other end of which is received in a socket 22 in a friction shoe 23. Shoe 23 is positioned in frictional bearing with the surface of the drum and between, and therefore in the paths of, the abutments 9 of the brake band, the length of the shoe being less than the space between said abutments, thereby developing lost motion in the pick-up of the shoe by the leading end of the band. The shoe is further provided with a frictional surface, which is shown at 24, which has a higher coefficiency of friction than that of the facing 7 on the brake band. By the means just described, auxiliary frictional resistance is provided for the ends of the band and for amplfying braking effect; said resistance is reinforced by radially acting resilient means, and the lost motion insures desired restriction of the amplified braking effect to spring disturbances of the major order.

Over the open end of the drum is placed a closing cap 25 which is provided on its outer edge with a flange 26 adapted to telescope with the sides of the drum, the bottom of the flange being bent outwardly, as at 27, to form a second flange or ledge through which to hold the cap in place. The outer cylindrical surface of the drum is provided with a groove 28 and is adapted to receive one edge of the split ring 29 of U-shaped cross-section, positioned around the drum, the other edge of which engages the flange 27 of the cap 25 so as to lock it in position. The split ring 29 has packing 30 placed therein for sealing the crack between flange 26 and the drum, against passage of dirt or moisture to the interior of the brake. The split ring 29 is clamped in position by the brackets 31 on the ends of the ring, having bent ends 32 perforated to receive the bolt 33 in the manner shown, so that by turning up the nut 34, the parts may be locked in cap-securing and sealing relation. Cap 25 is provided centrally with an opening 35, larger in diameter than the hub of the yoke, and permitting passage of the hub with clearance on all sides. This opening is likewise sealed against the admission of moisture and dirt by the packing rings 36 and 37, positioned on the inner and outer sides of the closing plate 25, in a manner to be maintained by the oscillated braking element in proper position; said packing rings 36 and 37 being positioned, the one between the shoulder 38 on the yoke and inner face of the cap, and the other between the radial arm 15, or washer 39 and the outer face of the cap, as shown in Figure 1.

Figures 3 and 4 show an embodiment of the invention with the radial resilient means, directly acting upon and reinforcing the leading ends of the brake band, with the brake shoe omitted, and with the leading ends of the brake band providing the entire friction-building influence for expanding the brake band and developing braking action. The brake drum 3ª, radial arm 48ª and yoke 10ª assume the positions of corresponding parts in the modification first described, but in this instance, the brake band 43 mounted on the arms of the yoke has its friction surface divided into three sections, such as shown at 40, 41 and 42, all rigidly attached to and adapted to move with the brake band when the latter is driven by the yoke. The leading ends of the brake band are resiliently pressed into frictional bearing against the surface of the drum by coiled springs 44 and 45 seated on the yoke, as at 46 and 47, the yoke, arm, band and springs all moving together. In this instance, the material selected for the friction facings 40 and 41 is of a higher coefficiency of friction than facing 42 so as to cause greater frictional resistance to movement at the two ends, which become leading ends of the brake band depending upon the direction of movement.

In either form of the invention, the means employed for articulating the radial operating arm 48 or 48ª with the axle of the vehicle, is that shown in Figure 1, and comprises an enlarged eye at the outer end of the arm, such as shown at 49, a rod 50 adapted to be positioned in the eye 49 and provided with screw-threads 51 and 52 to receive the nuts 53 and 54 on opposite sides of said eye, and adjustably sustaining washers 55 and 56 which support a resilient motion transmitting member 57 surrounding the rod and distributed on opposite sides of the eye; such resilient transmitting member being conveniently though not necessarily made in the form of two resilient blocks 57ª and 58ª. It has shoulders 58 through which it bears against opposite sides of the arm when compressed by the nuts and washers, and thus serves to resiliently transmit axial movement of the rod to the arm while permitting freedom of angular movement between them, further flexibility being provided for by the elongation 64 in the rod opening which permits the radial arm to move in an arc while connected to the axle-connected bracket, which bracket moves in substantially a straight line, some of the relative movement being taken up in the bodily movement of a part of the resilient mass whereas the remaining movement is effected by distorting other parts of the resilient mass. The transmitting member 57 may be provided with a circular bore of greater diameter than the rod 50, and it includes a portion within the eye 49, forming a spacing element between the metal parts. The flexibility of this connection varies according to initial compression of the resilient transmitting member 57 and such compression is determined at will by adjustment of the nuts 53 and 54. The lower end of the rod 50 is connected to the bracket 59 by a similar non-metallic resilient and angularly flexible connection 60 likewise capable of adjustment, by confining nuts 53ª, 54ª. Bracket 59 has a jaw 61 rigid thereon, with a groove adapted to engage one flange of the axle 2, a jaw 62 sliding thereon, with a groove to engage an opposite flange of the axle and a nut 63 threaded on its outer end and adapted to press the two jaws together.

The operation of the modification of my invention shown in Figures 1 and 2 is as follows: Under ordinary running conditions, relative movement of the axle 2 and the chassis frame 1 will be slight and only minute movements will be transmitted to the radial arm 48 by the connecting rod 50, and only correspondingly slight oscillation will occur in the yoke 10, and these being relatively slow and being resisted only by the leading end, will meet with slight braking resistance. The yoke 10 and the radial arm 48 by virtue of their construction have only a floating center of oscillation; the friction surface of the drum alone will serve as their guiding bearing; and all thrusts occasioned by movement of the axle 2, relatively to chassis frame 1, will be imparted directly to said friction surface. But when excessive movements occur between the axle and chassis frame and the oscillation of the brake band is amplified, the leading end of the band not only builds up its own resistance by the suddenness of the movement but it adds the resistance of the friction shoe 24 so that the now relatively great reluctance of the leading end causes an increased expansion in the band, and a built-up frictional resistance commensurate with the energy to be absorbed. The spaces between the ends of the friction shoe and the abutments 9 of the brake band may be of any suitable measurement, the distance varying with different installations.

Referring now to Figures 3 and 4, in operation the device is similar to that of the modification first described, so far as concerns slight resistance to spring movements of minor amplitude and substantial curbing of movements of objectionable amplitude and force, but the leading ends alone, reinforced by the radial springs, are depended upon to produce the results; the band being adapted to develop slight resistance under slow and short movements of the spring, and large braking forces under excessive action thereof by having the band equipped with a special character of facing material, for instance, smooth surface chrome-tanned leather, at the leading ends which will afford great coefficiency of friction under sudden movement and with a coarser leather that will have a low initial coefficient of friction over the remaining portion.

The above detail description and disclosure in the drawings illustrate the preferred embodiments of the invention, but it is to be understood that the invention includes all modifications that fall within the scope of the appended claims.

I claim:

1. In an energy absorbing device, comprising a drum member, and a band member relatively rotatable and in frictional bearing with each other, a friction shoe also in frictional bearing with the drum member, in the path of the brake member, and adapted to be moved by and have its frictional resistance added to that of the brake member, in either direction of relative rotation of the said members.

2. In an energy absorbing device, comprising a drum member, and a band member relatively rotatable and in frictional bearing with each other, a friction shoe also in frictional bearing with the drum member, in the path of the brake member, and adapted to be moved by and have its frictional resistance added to that of the brake member, in either direction of relative rotation of the said members, there being lost motion between the brake shoe and the band member, which permits the band member to act independently of the brake shoe during a limited portion of the relative rotation.

3. In an energy absorbing device, comprising a drum member and a split band member having spaced ends, said members being in frictional bearing one with the other and relatively rotatable in opposite directions, a brake shoe interposed between the ends of the band member and in frictional bearing with the drum member and adapted to engage either end of said band.

4. In an energy absorbing device, comprising a drum member and a split band member having spaced ends, said members being in frictional bearing one with the other and relatively rotatable in opposite directions, a brake shoe interposed between and adapted to engage the ends of the band member and in frictional bearing with the drum member, there being lost motion between the brake shoe and the band member in each direction of relative rotation between the members.

5. In an energy absorbing device, a drum member, and an expansible band member in frictional bearing one with the other and relatively rotatable, the band member having a resilient, free leading portion in either direction of rotation normally developing frictional resistance to movement and building up expansion in the band member, and a brake shoe also in frictional bearing with the drum member, in the path of said leading portion, and adapted to add its frictional resistance to that of said leading portion.

6. In a double acting energy absorbing device, a drum member, an expansible band member split and having its ends spaced apart, said members being in frictional bearing one with the other and being relatively rotatable, and the spaced ends of the band member being radially resilient and free to expand and develop initial frictional resistance to movement upon the drum member, and a brake shoe interposed between said ends, also in frictional bearing against the drum member, and adapted to add its frictional resistance to that of either end of the brake member.

7. In an energy absorbing device, a drum member, an expansible band member in frictional bearing with said drum member, means for developing relative rotation between said members, a brake member having a resilient, free leading portion normally developing initial pressure against the drum member and causing expansion in the band by frictional resistance thereof, and automatic means increasing the frictional resistance of said resilient end portion in either direction of rotation.

8. In an energy absorbing device, a drum member, an expansible band member in frictional bearing with said drum member, means for developing relative rotation between said members, a brake member having a resilient, free leading portion normally developing initial pressure against the drum member and causing expansion in the band by frictional resistance thereof, and automatic means increasing the frictional resistance of said resilient end portion in either direction of rotation comprising radially acting spring means.

9. In an energy absorbing device, a drum member, an expansible band member in frictional bearing with said drum member, means for developing relative rotation between said members, a brake member having a resilient, free leading portion normally developing initial pressure against the drum member and causing expansion in the band by frictional resistance thereof, and automatic means increasing the frictional resistance in either direction of rotation of said resilient end portion comprising a brake shoe in the path of said end and also in frictional bearing with the drum member, and a radial spring acting against said brake shoe.

10. In an energy absorbing device, a drum member, an expansible band member in frictional bearing with said drum member, said members being mounted for relative rotation, a yoke member connected with said band member and controlling the same in said relative rotation but leaving an end of said band member free and unrestrained in its pressure against the drum member, a brake shoe in frictional bearing with said drum member and in the path of said free end, and resilient means sustained by the yoke and acting radially against said brake shoe to increase its frictional resistance to movement by the band member.

11. In an energy absorbing device, a cylindrical member, braking means in frictional bearing with said cylindrical member and including a split band, an oscillatory yoke connected with said split band remotely from the ends of the band, having its center of oscillation determined by the braking means alone, and radially acting resilient means located between said yoke and a portion of the braking means at a point remote from the connection of the yoke to the band.

12. In an energy absorbing device, a drum member, a band member in frictional bearing with said drum member, a cap member forming a closure for said drum member and including a flange telescoping with a cylindrical wall of the drum member, and a clamping ring surrounding portions of the cap, flange and drum, and interengaging with each of them in the direction of telescoping movement to hold them against separation.

13. In an energy absorbing device, a drum member having a cylindrical wall, a band member within said drum member, a cap member having a flange telescoping with the cylindrical wall of the drum member, the flange of the cap and the cylindrical wall of the drum member being each shouldered for engagement in the direction of telescoping movement, and a clamping ring embracing portions, respectively, of said cylindrical wall and flange and having inturned lips interlocking with the shoulders thereof.

14. In an energy absorbing device a member having a friction surface and a flexible friction member having inherent expanding resilience adapted to engage said surface to frictionally resist relative rotation therebetween, means connecting said friction surface to one element and said friction member to a second element, between which relative movement takes place, said means being constructed to confine the relative movement between said friction surface and said friction member to relative rotary movement by means of their frictional contact only, said frictional contact extending throughout the entire surface of said friction member.

15. In an energy absorbing device a friction surface connected to one element and a flexible friction member having inherent expanding resilience connected to a second element which has relative movement with said first element, said friction surface and friction member being connected for relative rotary movement by means of their frictional contact only, said frictional contact extending throughout the entire surface of said friction member.

Signed at Detroit, Michigan, this 14th day of December, 1926.

MARK HARRIS.